United States Patent [19]

Long

[11] Patent Number: 5,316,128

[45] Date of Patent: May 31, 1994

[54] PARTICULATE MATERIAL FEEDER

[75] Inventor: David H. Long, Springfield, Ohio

[73] Assignee: Jet-Pro Company, Inc., Atchison, Kans.

[21] Appl. No.: 667,271

[22] Filed: Mar. 11, 1991

[51] Int. Cl.$^5$ ............................................. B65G 47/19
[52] U.S. Cl. ..................................... 198/530; 198/532
[58] Field of Search ................... 198/530, 532, 550.12, 198/540, 716, 735.3, 735.4, 728

[56] References Cited

U.S. PATENT DOCUMENTS

| | | | |
|---|---|---|---|
| 261,630 | 7/1882 | Roberts et al. | 198/530 |
| 688,912 | 12/1901 | Watts | 198/532 |
| 1,596,840 | 8/1926 | Kopf | 198/530 |
| 1,760,848 | 5/1930 | Moss | 198/728 |
| 2,097,381 | 10/1937 | Nadeau | 198/532 |
| 2,311,747 | 2/1943 | Gooch | 198/728 |
| 4,372,440 | 2/1983 | Ringis | 198/728 |
| 4,419,834 | 12/1983 | Scott | |

Primary Examiner—Joseph E. Valenza
Attorney, Agent, or Firm—Robert E. Stebens

[57] ABSTRACT

A particulate material feeder is provided having a material dispensing hopper cooperating with a continuous conveyor revolving in a vertical plane having a plurality of spaced flights operating over a horizontal bedplate for controlled feeding of material over the bedplate in a uniform thickness layer. The dispensing hopper is positioned in longitudinal alignment with the conveyor at one end thereof and has a discharge throat located a distance vertically above the bedplate with a transfer plate extending from the throat to the bedplate with a portion of the transfer plate at its end joining with the bedplate being arcuately curved in conformity to the path of movement of the conveyor flights. The dispensing hopper has a selectively positionable valve plate that is adjusted to and maintained at a position with respect to the throat for control of the depth of material displaced over the bedplate.

12 Claims, 3 Drawing Sheets

PARTICULATE MATERIAL FEEDER

FIELD OF THE INVENTION

This invention relates in general to apparatus for feeding of particulate material into and through apparatus for effecting treatment or processing of the particulate material. It relates more particularly to a material feeder in which particulate material is dispensed by gravity flow from a hopper containing a quantity of the material through an adjustable throat for effecting control of the rate of flow of the material into association with the respective flights of a drag conveyor for feeding of the material in a uniform thickness layer into or through a chamber for effecting treatment or processing of the material.

BACKGROUND OF THE INVENTION

This invention finds specific application in the field of treating agricultural grain products such as soybean, corn or cereal grains which can be described as particulate material. However, the invention has application in other fields for processing of other types of particulate material, although the invention will be described with respect to the processing of agricultural grain products to demonstrate its unique capabilities in enhancing the treatment process.

One type of processing of agricultural grain products consists of heating of the grain to effect roasting and thus effect changes in the state or condition of the grain. One such apparatus for effecting roasting of the grain comprises a treatment chamber which includes a horizontally disposed bottom plate over which the grain is caused to traverse with that plate being perforated to permit passage of treatment media such as heated air to pass therethrough and then through the layer of grain. Transfer of the grain over that plate is effected by a drag conveyor of elongated construction such that the lower run will cause the grain to move at a predetermined rate in accordance with the treatment media being passed through the grain such that the grain will be fully processed during its travel from an inlet through a discharge end of the treatment chamber.

It is important that the introduction of the unprocessed grain be effected in a manner such that the heated air or other treatment media will not escape from the treatment chamber through the inlet or entrance end to that chamber. It is also important that the grain be introduced at a controlled flow rate to form a layer of uniform depth on a supporting bedplate in order to optimize the effect of the processing or treatment. This is necessary as such apparatus is set up and adjusted to operate at a predetermined constant condition as to the amount of material that can be processed during its traversing of the treatment chamber in accordance with the conditions and characteristics of the treatment media. A drag conveyor such as is utilized in the specific grain roasting apparatus utilized as an example of such mechanisms requires introduction of particulate material comprises a number of flights formed by transversely extending sheets or plates that are longitudinally spaced a distance to accommodate a specified amount of the material and to effect its displacement over the bedplate. Feeding apparatus that has been utilized in association with such treatment apparatus has included dispensing mechanisms of the paddle wheel type as well as the auger type conveyors. A paddle-type dispenser comprises a number of elongated blades that are angularly spaced about a central supporting axle and extend radially outward from that axle. This paddle assembly is disposed in an elongated tubular housing having an inlet aperture formed at an upper side through which the material flows into the housing by gravity. As the paddle mechanism is revolved, quantities of the material are then entrapped between adjacent blades or paddles and revolve to a downward position associated with a discharge opening. At that point, the material entrapped between a pair of blades is then dropped or dumped through the discharge opening and onto the conveyor and supporting bedplate. While a paddle-type dispenser is capable of providing a substantially satisfactory air lock to prevent loss of the treatment media such as heated air through the inlet, the disadvantage of such a mechanism is that the material is not deposited in a uniform layer. The material is deposited in a pulse-type action in batches that are determined by the size of the paddles and their relative spacing. Control over the rate of inflow is accomplished by altering the rotational speed of the paddles in accordance with the rate of movement effected by the drag conveyor. Since the drag conveyor is operated at a speed such that the material will be maintained in the processing chamber for a predetermined time interval, it is thus necessary that the paddle-type dispenser be provided with a variable speed drive so that it may be adjusted to accommodate the speed of the drag conveyor and to also deposit the particulate material in a layer of desired thickness for a specific processing operation. This requires relatively expensive drive motors and mechanisms as well as associated complex control equipment. The auger-type conveyors suffer the same operational disadvantage of requiring variable speed drives for the same reasons as the paddle-type dispenser, but, additionally, auger-type conveyors do not provide a good air lock to prevent outflow of the treatment media through the infeeding mechanism.

Another disadvantage of the paddle-type feed mechanism is that uniformity of the quantity of material and the consequent thickness of the layer between two adjacent conveyor flights cannot be reliably controlled. The paddles of such a dispenser deliver the product in discreet quantities and it is not possible to assure that those quantities are delivered totally to a single space between adjacent flights. It is very likely that the paddle delivery system will not be synchronized with the movement of the conveyor flights, and thus, quantities or batches of the material may be delivered at the passage of a conveyor flight and be split as between two adjacent spaces in a manner that cannot be predicted to divide a batch evenly or equally between the two adjacent conveyor flight spaces.

SUMMARY OF THE INVENTION

In accordance with this invention, a gravity-type material dispenser is provided in combination with a drag conveyor with that conveyor in the illustrative embodiment also functioning to effect traversing movement of the particulate material through the treatment chamber. The dispenser includes a hopper of a size to contain a quantity of the particulate material with it being understood that auxiliary feeding apparatus may be provided to continually replenish the quantity of material in the hopper. The bottom of the hopper is provided with an inclined bottom plate and a sidewall of the hopper adjacent the treatment chamber and also the end of the drag conveyor is formed with a throat that extends across the width of the dispenser and is of the same dimension as the transverse width of the conveyor flight. Positioned in the hopper is a flow control plate that can be vertically adjusted with respect to the throat to alter the size of the throat and thereby regulate the quantity of the particulate material that may flow out of the hopper. A transfer plate associated with the inclined bottom plate of the hopper extends forwardly and under the bottom run of the drag conveyor. The dispenser and transfer plate are arranged to underlie the arcuate portion of the drag conveyor's path of movement at the inlet end of the treatment chamber with the transfer plate terminating at its extreme end edge in association with the bedplate of the treatment chamber, and thus, forming a continuous supporting surface with respect thereto. The drag conveyor flights pass in an arcuate path to cause the respective plates to enter into the particulate material flowing out of the hopper through the throat and into association with the transfer plate. The conveyor flights thus effect the separation of the continuously flowing particulate material to result in formation of a substantially uniform thickness layer of material that is then subsequently caused to traverse over the bedplate in the treatment chamber. Alteration of the speed of movement of the drag conveyor will thus automatically accommodate the amount of material that is collected onto the bedplate for treatment through cooperative operation of the control plate at the discharge throat of the hopper. No other control mechanisms are required to obtain the desired rate of flow in accordance with the speed of travel of the drag conveyor to obtain a layer of material of predetermined thickness. The particulate material collected in the hopper and above the discharge throat effects an air lock to prevent passage of the treatment media in a rearward flow-direction from the treatment chamber.

These and other objects and advantages of this invention will be readily apparent from the following detailed description of an illustrative embodiment of the grain roasting apparatus provided with a particulate material feeder of this invention and the accompanying drawings.

DESCRIPTION OF THE DRAWING FIGURES

DETAILED DESCRIPTION OF THE ILLUSTRATIVE EMBODIMENT

Figure 1:
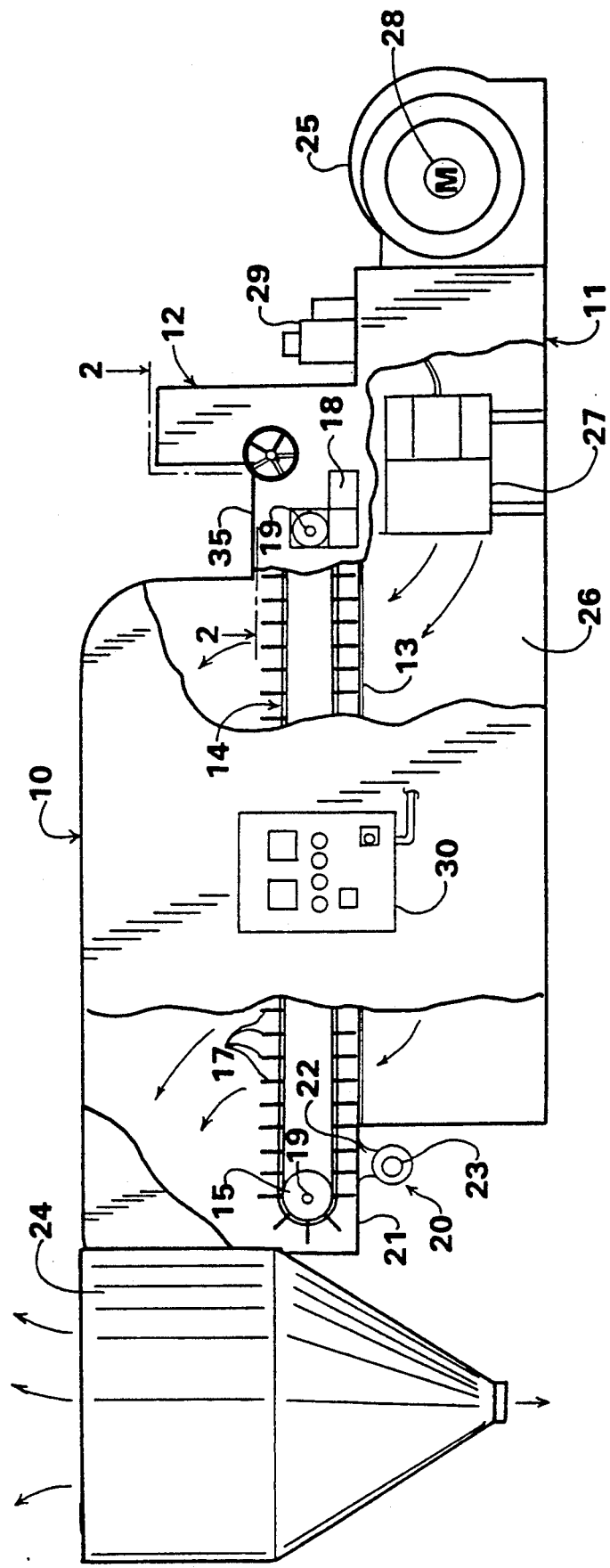
FIG. 1 is a diagrammatic side elevational view of a grain roasting apparatus embodying the particulate material feeder of this invention.
Figure 2:
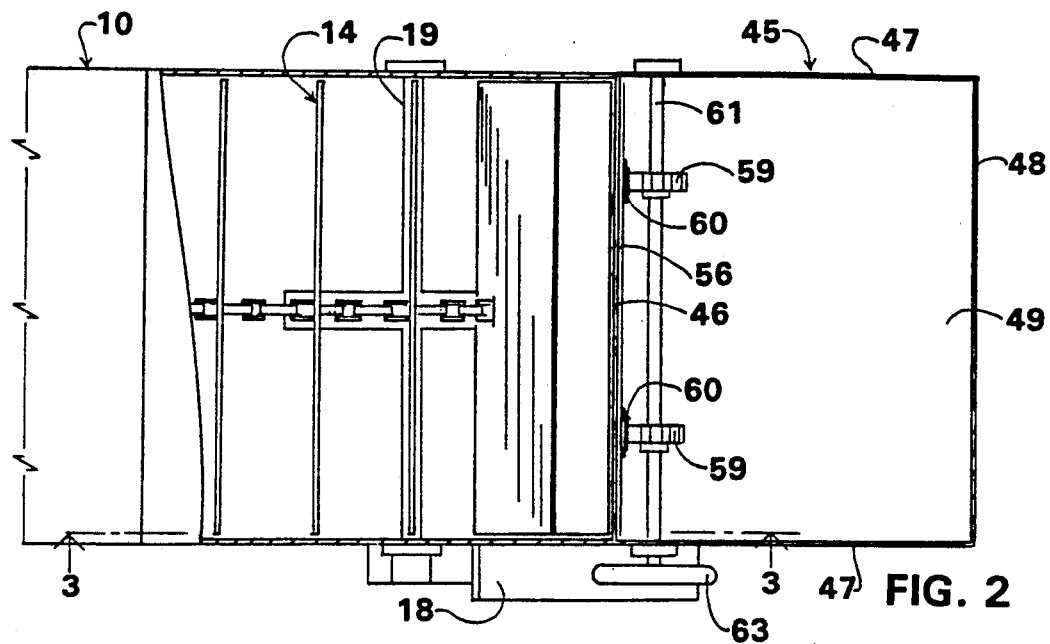
FIG. 2 is a fragmentary sectional view on an enlarged scale taken along line 2—2 of FIG. 1.
Figure 4:
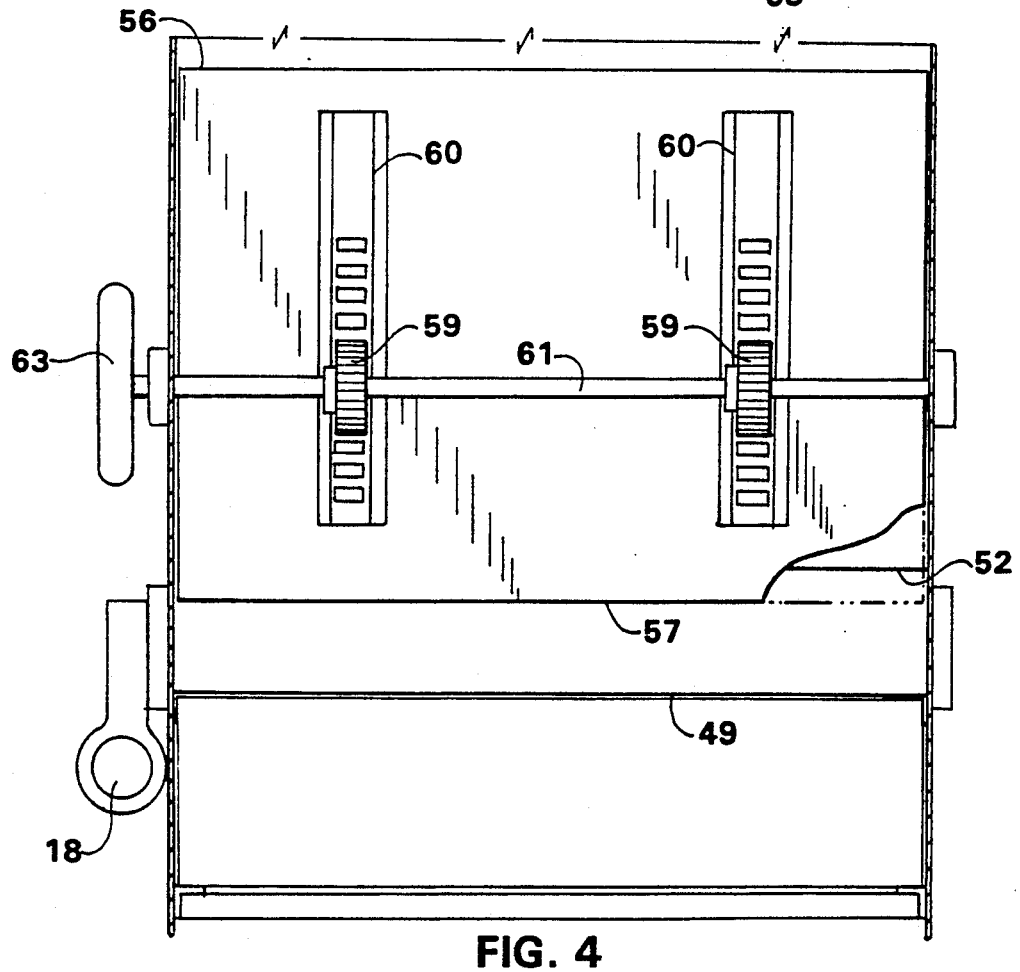
FIG. 4 is a fragmentary sectional view taken along line 4—4 of FIG. 3.
Figure 3:
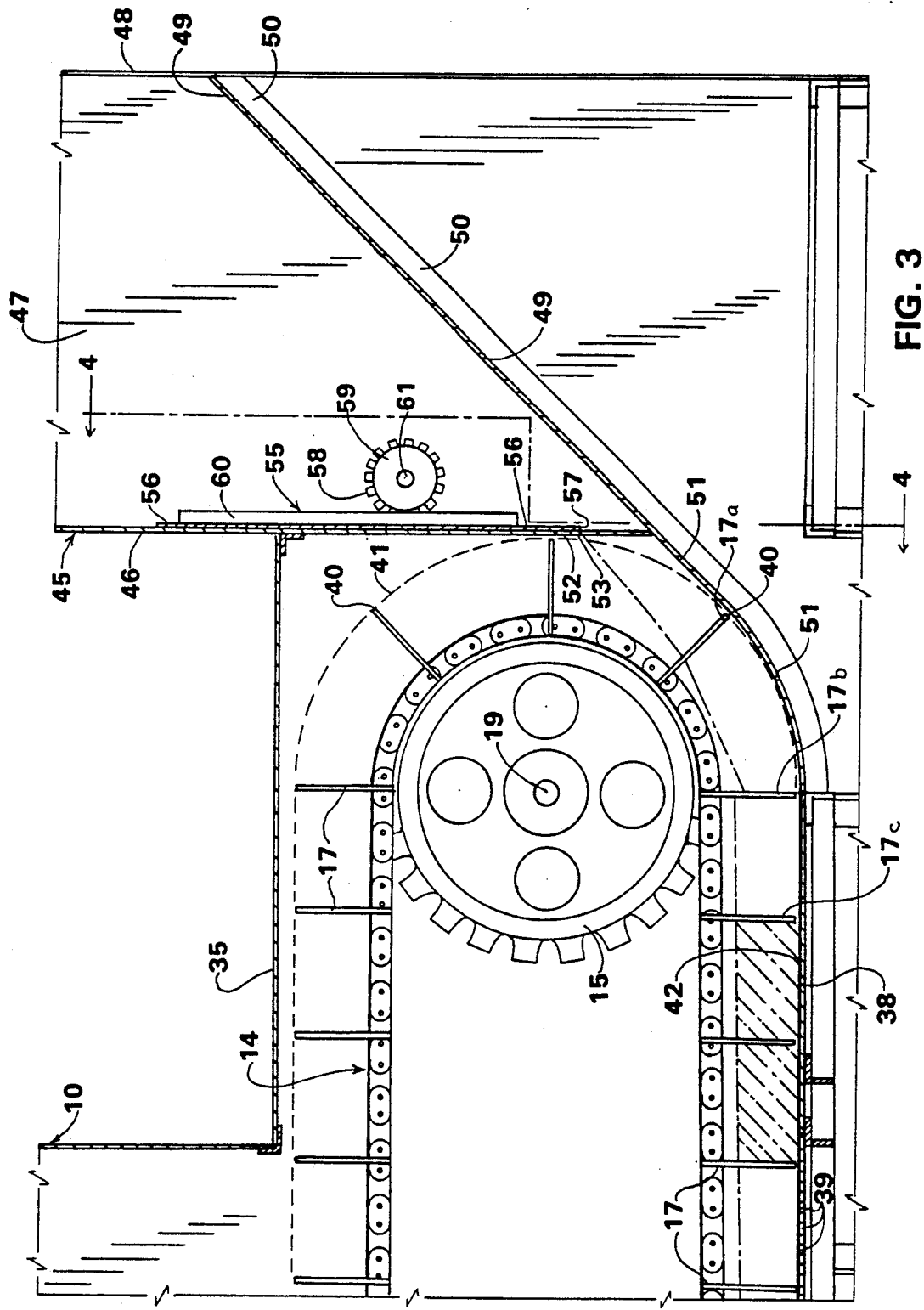
FIG. 3 is a fragmentary sectional view on a further enlarged scale taken along line 3—3 of FIG. 2.

Having reference to FIG. 1, a grain roasting apparatus is diagrammatically illustrated and which embodies this invention. This roasting apparatus includes an elongated treatment chamber 10, a treatment media supply means 11 and a particulate material dispenser 12. The treatment chamber 10 is provided with an elongated, horizontally disposed bedplate 13 over which the particulate material is caused to traverse during the course of the treatment operations. This bedplate 13 throughout most of its longitudinal and transverse extent is formed with a large plurality of apertures through which the treatment media, such as for example, air at a substantially elevated temperature, is caused to pass and to flow through the bed of particulate material that is formed on the upper surface of the bedplate. Displacement of the particulate material through the treatment chamber is effected by a drag conveyor 14 supported in a vertical plane on opposed sprocket wheels 15 with the upper and lower runs of the conveyor disposed horizontally and the lower run positioned to move over the upper surface of the bedplate 13. Forming the drag conveyor 14 is an elongated sprocket chain 16 trained around the sprocket wheels 15 and carrying a plurality of transversely extending flights 17. Each of the flights comprises a structurally rigid plate that is rigidly secured to a respective link of the sprocket chain to be maintained in perpendicular relationship to the chain. These flights are of a width to extend essentially across the width of the bedplate 13 and the treatment chamber. A drive mechanism 18 is mechanically coupled to one of the sprocket wheels 15 and in the illustrative FIG. 1 embodiment, it is shown as coupled with the sprocket wheel located at the right end of the machine or at the entrance end to the treatment chamber. This drive mechanism may advantageously comprise an electric motor with gear coupling which is engaged with the supporting shaft 19 of the sprocket wheel as is seen in FIGS. 2, 3 and 4.

Discharge means 20 for effecting removal of the treated material from the chamber is positioned at the left end of the apparatus as shown in FIG. 1 and in downstream relationship to the bedplate 13. This discharge means is illustrated as being an auger-type conveyor extending transversely of the treatment chamber in underlying relationship to a bedplate extension 21 having an upwardly facing, transversely disposed opening 22 through which treated material flows from the chamber and into the auger. An electric motor drive 23 is coupled to the discharge means auger for displacing of the material into a receiving device.

Also coupled with the treatment chamber at the discharge end is a debris collector 24 which functions to remove debris that may be entrained in the air that will be exhausting from the treatment chamber at this end of the apparatus. This collector 24 may be of the cyclone type which separates the debris that is generated during the processing operation from the air that is exhausted at the top of the collector and the solid components of the debris then routed down-wardly for collection in a suitable receptacle and disposal.

The treatment media supply means 11 comprises a blower 25 coupled with a plenum chamber 26 disposed in underlying relationship to the bedplate 13 of the treatment chamber. This plenum chamber 26 extends the full length of the bedplate 13 containing the apertures through which the air flows upwardly and through the material disposed on top of the bedplate. Positioned adjacent the inlet end to the plenum chamber in downstream relationship to the blower 25 is a heating device 27 in the nature of a burner adapted to be fueled by a combustible petroleum product such as natural gas. Airflow developed by the blower 25 is directed through and around the heating device where its temperature will be elevated in accordance with the quantity of air flowing through the unit and also in accordance with the heat generated by the device. The blower 25 is provided with an electric motor 28 which may be of a variable speed type to permit operator control over the rate of flow of air through the apparatus. A fuel control mechanism 29 is also provided to permit operator control over the amount of combustible fuel routed to the heating device 27. This control mechanism is shown positioned on the top of the plenum chamber at the right side of the apparatus as seen in FIG. 1.

A main control panel 30 is provided as shown mounted on the central portion of the apparatus. This control panel includes the control devices for initiating or stopping operation of the conveyor and discharge means auger 20 as well as the controls for the drive motor 28 of the blower 25. The specifics of such a control panel and its operative devices are well-known to those skilled in this particular art and therefore neither those components nor further specifics of the drive mechanisms are illustrated or described. Similarly, the heating device 27 is not described in further detail as a device suitable for such an application is commercially available and its structure and operation well-known to those familiar with this particular art.

Specifics of the structure of the particulate material dispenser 12 and its functioning in cooperation with the drag conveyor 14 to form the feeder of this invention are best seen in FIGS. 2, 3 and 4. First, it will be noted that the terminal end portion of the drag conveyor 14 associated with the inlet end of the treatment chamber is housed within a reduced cross-sectional area of the chamber as the heated air for effecting treatment of the material does not pass through this section. This reduced size section of the treatment chamber is designated generally by the numeral 35 and includes extensions 36 of the vertical sidewalls and a top wall 37. Also, the bedplate 13 advantageously includes an extension 38 which is not formed with the perforations or apertures through which the treating media is caused to pass. It is advantageous that this bedplate extension not be provided with such apertures to better assure that the particulate material will have assumed a steady-state condition before it begins traversing of the bedplate provided with the apertures. Referring to FIG. 3, it will be seen that the bedplate 13 provided with apertures 39 essentially terminates at the beginning of the enlarged area treatment chamber. It will also be noted that in FIG. 3, as well as FIGS. 2 and 4, certain structural members in the form of L-shaped angle members are shown for structural rigidity of the apparatus, but these are for purposes of illustration only and are not indicative of an actual specific mechanical structure. The particular structural elements for support of the sheet metal components of the apparatus are not illustrated in further detail as they are not deemed to be of significance from the standpoint of patentability of this invention as to the material feeder. It will also be noted at this point that the drag conveyor 14 which is supported for movement in a vertical plane has the respective conveyor flights 17 formed with a uniform width and terminating in free extremities 40 which move along an arcuate path indicated diagrammatically by the numeral 41 at the inlet end to the treatment chamber and then progressively move along a path which effectively aligns with the upper surface 42 of the bedplate 13. The extremities of the flights thus slide over the upper surface of the bedplate 13 and assure positive movement of the entire quantity of particulate material that is positioned in forwardly facing relationship to the direction of movement of the respective flights.

Disposed in preceding relationship to the reduced size section 35 of the treatment chamber is the particular material dispenser 12. This dispenser includes a dispensing hopper designated generally by the numeral 45 which includes a vertically disposed front wall 46 that is disposed in closing relationship to the terminal end of the reduced size section of the treatment chamber 35. There are longitudinally extending vertical walls 47 and a transverse vertical wall 48 that are complemental to the front wall in defining a chamber of rectangular cross-section in horizontal plan view and which opens at its upper end. Effectively closing the bottom of the hopper is a bottom wall 49 which is shown as having downturned flanges 50 that are adapted to be mechanically secured to the longitudinal sidewalls 47. This bottom wall 49 as can be best seen in FIG. 3 is disposed in inclined relationship to descend downwardly in the direction of movement of the material through the treatment chamber. As illustrated in FIG. 3, this plate is disposed at an angle of about 45 degrees, but it will be understood that this angular relationship may be adjusted in accordance with the particular materials to be processed by the apparatus to either a steeper or lesser inclination to effect the desired gravity flow of the particulate material.

Again referring to FIG. 3, it will be seen that the bottom wall 49 continues forwardly of the front wall 46 in a downwardly inclined direction and terminates in an arcuately curved portion which is designated as a transfer plate 51. This transfer plate 51 has essentially the same arcuate configuration as the path of movement 41 of the free extremities 40 of the conveyor flights 17 and the upper surface of that transfer plate is seen to merge smoothly with the upper surface of the bedplate extension 38. It will also be noted that the front wall 46 of the dispensing hopper 45 is positioned to be closely adjacent to the peripheral path of movement 41 of the conveyor flights.

Referring to FIG. 3, it will be seen that the front wall 46 terminates in a bottom edge 52 spaced a distance vertically above the underlying bottom 49. Thus, the front wall in cooperation with the sidewalls 47 and bottom wall 49 defines a throat 53 at the lower end of the inclined bottom wall and through which the particulate material contained within the hopper 45 will flow by the force of gravity. The vertical elevation of the bottom wall 49 as well as the bottom edge 52 of the front wall 46 are relatively positioned as can be best seen in FIG. 3 to be at the location of the arcuate path of movement 41 of the conveyor flights 17 to be in the region where extremities 40 of those flights begin their downward and forward movement with respect to the movement of the particulate material through the treatment chamber. Control over the flow of the particulate material from the dispensing hopper 45 through the throat 53 is effected by a valve mechanism 55. This valve mechanism 55 includes a vertically disposed gate valve 56 which comprises a plate that is positioned and adapted to be displaced in a vertical upward or downward direction with respect to the front wall 46. The gate valve 56 which is of plate form and is adapted to reciprocate in a vertical direction adjacent to the front wall 46 at the inner face of the dispensing hopper, has a bottom edge 57 that extends horizontally across the transverse dimension of the treatment chamber. Accordingly, as the gate valve 56 is moved upwardly or downwardly, the vertical dimension of the throat 53 will be altered and thereby be capable of affecting the amount of particulate material that may flow through the throat as defined by the upper surface of the bottom wall 49 and the bottom edge 57 of the gate valve.

Positioning of the gate valve to effect its control over the outflow of particulate material from the hopper is affected by a control mechanism designated generally by the numeral 58. This control mechanism comprises, in the illustrative embodiment, a pinion gear 59 and rack 60. Two pinion gears 59 and racks 60 are provided in relatively spaced relationship and are transversely disposed across the front wall of the dispensing hopper. Each of the two pinion racks 60 is mechanically secured to the gate valve plate 56 with the pinion gears 59 mounted on a supporting axle 61 that is carried by the dispensing hopper 45. Referring to FIGS. 2 and 4, it will be seen that the axle 61 is mounted in respective bearings 62 that are secured to the sidewalls 47 of the dispensing hopper. Secured to one end of the axle 61 which projects a distance from the outside of the hopper is a control wheel 63 which may be manually operated to revolve the axle in either direction and thus either elevate the gate valve plate 56 or to lower it and thus adjust the effective opening of the throat 53. Frictional forces developed as between the gate valve plate 56 and the adjacent surfaces of the front wall 46 of the dispensing hopper provide a sufficient deterrent to inadvertent movement of the gate valve plate 56 without operation of the control wheel 63.

Functioning of the feeder can be best understood with reference to FIG. 3. In that diagram, the valve mechanism 55 is shown as having the valve plate 56 vertically adjusted to a position where its bottom edge 57 is a predetermined distance above the underlying bottom wall 49 resulting in the throat 53 having a predetermined cross-sectional area. Particulate material is thus able to flow downwardly out of the hopper through the throat and into the end portion of the reduced size treatment chamber 35. The material flows downwardly over the upper surface of the bottom wall 49 and into engagement with the opposing surface of a conveyor flight 17 which, for purposes of identification in conjunction with this operational description, is designated as conveyor flight 17a. It will be understood that the material would have first come into engagement with that conveyor flight when the flight was at an angular position where its free extremity 40 would have been at a vertical elevation which was coincident with the bottom edge 57 of the valve plate 56. Thus, as the drag conveyor 14 continued to be revolved, that conveyor flight 17a then progressively projected to an increasingly greater depth into the stream of material that was flowing downwardly from the hopper and which was previously brought into engagement with a preceding conveyor flight 17b. Thus, when the conveyor flight 17a reaches the position in which it is shown in FIG. 3, its free extremity 40 is closely adjacent the upper surface of the transfer plate 51 at the juncture of its flat and arcuately curved portions. At this point, the conveyor flight 17a is effective in preventing any further particulate material from entering into the space that is defined by the two adjacent flights 17a and 17b.

As the drag conveyor continues to revolve, the conveyor flights will also continue to move around the prescribed path. As the flights move to a next incremental position such as with flight 17b moving to the position illustrated in FIG. 3 as occupied by flight 17c, the material that is entrapped between the adjacent flights 17a and 17b will be confined to a rectangularly shaped configuration having its upper surface appearing slightly higher than is shown in the illustrated position between those two respective flights in FIG. 3. This results from the fact that the conveyor flights, when moving along a straight-line path, will assume a parallel relationship having a relatively closer spacing at the extremities than is the case when adjacent flights are angularly disposed to each other.

With this combination of a dispensing hopper and drag conveyor, very accurate control can be achieved over the quantity of particulate material that is dispensed into operational engagement with the drag conveyor. The particulate material has a certain degree of residual friction for any particular type of material and thus it does require a certain amount of time for the material to flow through the throat for a specific setting, and thus, in coordination with the movement of the conveyor the amount of material that is placed between any two adjacent flights can be controlled to a very precise degree. This is of particular advantage since the treatment of the material will be optimally uniform where the depth of the layer of particulate material traversing over the bedplate 13 is maintained at a constant depth for a specific treatment operation. It will also be noted that since the bedplate extension 38 as well as the transfer plate 51 are not formed with apertures, and thus, the treatment media cannot pass through into the material as it is brought into each of the respective spaces between adjacent conveyor flights. Thus, the inflow of the material will not receive any interference as to its flowing into the spaces and forming into a uniform thickness layer. With the particulate material thus filling the throat 53 and filling the lower portions of the hopper, none of the treatment media will exit through the feeder.

It will be readily apparent that the feeder of this invention can be easily and quickly adjusted to meet specific operating criteria for any particular type of particulate material. For example, an increase or decrease in the speed of the drag conveyor to effect a respective decrease or increase in the amount of time that is required for the material to traverse the treatment chamber can be accommodated by appropriate adjustment of the valve mechanism 55 on the dispensing hopper so as to result in a desired depth of material being carried over the bedplate 13. Similarly, for a predetermined speed for the drag conveyor, the depth of the layer of particulate material traversing the bedplate can be readily adjusted through elevation or lowering of the valve plate 56 to increase or decrease the size of the throat 53 and to consequently increase or decrease the depth of the layer of material. This accommodation of varied operating criteria is readily achieved through the simple mechanical positioning of the valve plate 56 at a desired elevation to effect the necessary control over the flow rate of the particulate material from the dispensing hopper. Also, different particulate materials may have different flow characteristics and the feeder of this invention can be easily adjusted to accommodate a specific type of material.

Having thus described this invention, what is claimed is:

1. Apparatus for feeding of particulate material into a receiver at a predetermined flow rate comprising
    A) an elongated bedplate having an upwardly facing top surface for support of particulate material thereabove, B) transport means for effecting displacement of particulate material longitudinally over said bedplate, said transport means including
  1) a continuous conveyor supported for revolution in a vertical plane extending longitudinally over said bedplate with upper and lower runs and having a plurality of flights disposed in relatively spaced relationship extending transversely to their plane of revolution with said flights having outer extremities which on the lower run are disposed in close proximity to the top surface of said bedplate, said conveyor being supported at a first end for movement of said flights about an arcuate path to the lower run traversing over said bedplate, and
  2) drive means mechanically coupled with said conveyor and operable to effect revolution thereof with the flights on the lower run moving forwardly in a direction away from said first end, and
C) a particulate material dispenser disposed adjacent the first end of said conveyor in longitudinally aligned relationship thereto including
  1) a dispensing hopper disposed closely adjacent but spaced a distance rearwardly to the first end of said conveyor in longitudinally spaced relationship to the path of movement of the outer extremities of said flights and adapted to receive and contain a quantity of particulate material, said dispensing hopper having a discharge throat disposed at a bottom end thereof extending transversely with respect to said conveyor's plane of revolution and through which material flows downwardly out of said hopper in a stream of predetermined transverse extent and thickness in a direction toward said conveyor, said discharge throat disposed a distance above said bedplate whereby particulate material flows out of said hopper and into association with said conveyor flights during the course of their arcuate path of movement in a downward and forward direction at said conveyor's first end, and
  2) a transfer plate disposed in underlying relationship to said throat for receiving material discharged therethrough and extending in downwardly inclined relationship in the direction of movement of the lower run of said conveyor joining with said bedplate and forming a contiguous top surface therewith, said transfer plate being arcuately curved for a distance from its juncture with said bedplate in conformance with the arcuate path of movement of the outer extremities of said conveyor flights and having an upper surface disposed to lie in close proximity to the outer extremities of said conveyor flights during the course of their traversing movement thereover whereby said conveyor flights are caused to enter into the material on said transfer plate and to thereafter control its displacement onto and over said bedplate in a uniform thickness layer.

2. Apparatus according to claim 1 wherein said dispensing hopper includes flow control means disposed in operative relationship to said throat for regulating the flow of material out of said hopper.

3. Apparatus according to claim 2 wherein said flow control means is selectively operable for changing the size of said throat.

4. Apparatus according to claim 1 wherein said dispensing hopper includes an upstanding front wall disposed in facing relationship to the first end of said conveyor and terminating at its bottom in a horizontally extending bottom edge that forms the top of said throat, a bottom wall disposed in spaced parallel relationship to said bottom edge and defining the bottom of said throat and inclined upwardly therefrom, said transfer plate joining with said bottom wall forming therewith a continuous downwardly sloping surface over which the material moves toward said bedplate from said hopper.

5. Apparatus according to claim 4 wherein said throat is of a horizontal extend substantially equal to the transverse width of said conveyor flights and having transversely spaced end edges extending between said bottom wall and the bottom edge of said front wall.

6. Apparatus according to claim 4 wherein said throat is of a predetermined transverse width terminating in spaced apart end edges extending between said bottom wall and the bottom edge of said front wall defining said throat; and said dispensing hopper includes a selectively operable valve mechanism disposed in operative relationship to said throat for affecting regulation of the flow of material out of said hopper.

7. Apparatus according to claim 6 wherein said valve mechanism includes a valve plate supported for relative displacement across said throat to a selected position in at least partially blocking relationship thereto for affecting adjustment of the effective size of said throat and thereby control the quantity of material discharged onto said bedplate.

8. Apparatus according to claim 7 wherein said valve mechanism includes a control mechanism mechanically coupled with said valve plate and selectively operable to displace said plate to a desired position and to maintain said plate in the position to which it is displaced.

9. Apparatus according to claim 4 wherein said front wall's bottom edge is disposed vertically above said bottom wall and said dispensing hopper includes a selectively operable valve mechanism having a valve plate disposed in adjacent and coplanar relationship to said front wall and a control mechanism mechanically coupled with said valve plate, said control mechanism selectively operable to displace said plate to position a marginal end portion thereof in at least partially overlying relationship to said throat to thereby affect adjustment of the effective size of said throat for controlling the quantity of material discharged onto said bedplate.

10. Apparatus according to claim 9 wherein said valve plate's marginal end portion includes an end edge disposed in parallel relationship to said front wall's bottom edge.

11. Apparatus according to claim 9 wherein said valve plate is disposed in contacting engagement with said front wall and supported for sliding movement thereover, said control mechanism includes first and second cooperatively engageable gear elements with a first of said gear elements fixed to said valve plate and a second of said gear elements supported for selective operation in driving of said first gear element to effect displacement of said valve plate.

12. Apparatus according to claim 9 wherein said valve plate is disposed in contacting engagement with said front wall and is slideable thereover, said control mechanism including a pair of rack and pinions with each of the racks secured to said valve plate in spaced parallel relationship to each other and to the direction of reciprocal movement of said valve plate, said pinions being mounted on a common shaft supported in operative engagement with respective ones of said racks whereby rotation of said shaft will cause displacement of said valve plate.

* * * * *